US011875396B2

(12) United States Patent
Holt et al.

(10) Patent No.: US 11,875,396 B2
(45) Date of Patent: Jan. 16, 2024

(54) SYSTEMS AND METHODS FOR DISPLAYING A SIMULATED ROOM AND PORTIONS THEREOF

(71) Applicant: Lowes Companies, Inc., Mooresville, NC (US)

(72) Inventors: Blair Thomas Holt, Charlotte, NC (US); Kurt James Jansen, Huntersville, NC (US); Shannon Wadford Boggess, Huntersville, NC (US); Randall Allen Miller, Mooresville, NC (US); Paula Gragg Ferguson, Moravian Falls, NC (US); Jeffrey Donald Key, Mooresville, NC (US); Jeffrey Robert Pollard, Mooresville, NC (US); Zeke Robert Markshausen, Chicago, IL (US); Garrett Lee Winther, Chicago, IL (US); Kathryn Soven, Chicago, IL (US); Carl David Sjunnesson, Chicago, IL (US); Kyle Fletcher, Chicago, IL (US); Elizabeth Spenko, Chicago, IL (US); Joseph Thomas Graceffa, Rockford, IL (US); Travis Schultz Lee, Chicago, IL (US); Aaron Randall Ferber, Chicago, IL (US)

(73) Assignee: Lowe's Companies, Inc., Mooresville, NC (US)

(*) Notice: Subject to any disclaimer, the term of this patent is extended or adjusted under 35 U.S.C. 154(b) by 265 days.

(21) Appl. No.: 17/367,122

(22) Filed: Jul. 2, 2021

(65) Prior Publication Data
US 2021/0334890 A1 Oct. 28, 2021

Related U.S. Application Data

(63) Continuation of application No. 15/150,973, filed on May 10, 2016, now Pat. No. 11,062,383.

(51) Int. Cl.
*G06Q 30/0601* (2023.01)
*G06T 19/00* (2011.01)
(Continued)

(52) U.S. Cl.
CPC .......... *G06Q 30/0643* (2013.01); *G06K 7/14* (2013.01); *G06Q 30/0623* (2013.01);
(Continued)

(58) Field of Classification Search
None
See application file for complete search history.

(56) References Cited

U.S. PATENT DOCUMENTS 7,391,424 B2 6/2008 Lonsing
7,457,730 B2 * 11/2008 Degnan .................. G06T 11/60
52/235

(Continued)

FOREIGN PATENT DOCUMENTS

KR 20130137968 12/2013
KR 20140081729 7/2014
(Continued)

OTHER PUBLICATIONS

Thomas, Bruce H., et al. "Spatial augmented reality—A tool for 3D data visualization." 2014 IEEE VIS international workshop on 3DVis (3DVis). IEEE, 2014.*
(Continued)

*Primary Examiner* — Ryan M Gray
(74) *Attorney, Agent, or Firm* — Kilpatrick Townsend & Stockton LLP

(57) ABSTRACT

A system for displaying a simulated room can comprise a projector, a wall structure element, a physical object, and a room customization station. The room customization station can view images of selectable products and allows a selection thereof to be displayed on the wall structure element or
(Continued)

the physical object. The projector can display the selectable product(s) on the wall structure element or the physical object. The physical object can be adjustable in size for different selectable product sizes. The system can include a physical accessory placeable in the simulated room to facilitate visualization of how the physical accessory would appear in the simulated room with the selectable product. Further, the room customization station can prevent a portion of the images from being projected onto a physical feature in the simulated room and allow other portions of the images to be projected into a portion of the simulated room.

20 Claims, 5 Drawing Sheets

(51) Int. Cl.
  H04N 9/31     (2006.01)
  G06T 15/10    (2011.01)
  G06K 7/14     (2006.01)
(52) U.S. Cl.
  CPC ............ *G06T 15/10* (2013.01); *G06T 19/006* (2013.01); *H04N 9/3147* (2013.01); *H04N 9/3173* (2013.01)

(56) References Cited

U.S. PATENT DOCUMENTS

| | | | |
|---|---|---|---|
| 7,627,502 | B2 | 12/2009 | Cheng et al. |
| 7,933,068 | B2* | 4/2011 | Peterson ................ G03B 21/56 |
| | | | 359/443 |
| 8,170,367 | B2 | 5/2012 | Moody et al. |
| 8,463,025 | B2 | 6/2013 | Melvin et al. |
| 8,668,498 | B2 | 3/2014 | Calman et al. |
| 8,687,104 | B2 | 4/2014 | Penov et al. |
| 8,797,354 | B2 | 8/2014 | Noge |
| 8,866,847 | B2 | 10/2014 | Bedi et al. |
| 9,001,154 | B2 | 4/2015 | Meier et al. |
| 9,129,404 | B1 | 9/2015 | Wagner |
| 9,164,577 | B2* | 10/2015 | Tapley ................... G06F 16/58 |
| 9,373,195 | B2 | 6/2016 | Kasahara |
| 9,418,378 | B2 | 8/2016 | Staicut et al. |
| 9,449,324 | B2 | 9/2016 | Shintani et al. |
| 9,552,650 | B2 | 1/2017 | Furuya |
| 9,563,825 | B2 | 2/2017 | Shen et al. |
| 9,697,416 | B2 | 7/2017 | Shen et al. |
| 9,728,010 | B2 | 8/2017 | Thomas et al. |
| 9,965,800 | B1 | 5/2018 | Pitstick et al. |
| 10,163,271 | B1 | 12/2018 | Powers et al. |
| 10,192,115 | B1 | 1/2019 | Sheffield et al. |
| 10,210,564 | B2* | 2/2019 | Qi ........................ H04N 9/3194 |
| 10,395,435 | B2 | 8/2019 | Powers et al. |
| 11,062,139 | B2 | 7/2021 | Sheffield et al. |
| 11,062,383 | B2* | 7/2021 | Holt ...................... H04N 9/3147 |
| 11,348,327 | B1 | 5/2022 | Ha et al. |
| 11,521,273 | B2 | 12/2022 | Jakka et al. |
| 11,599,950 | B2 | 3/2023 | Spader et al. |
| 11,615,619 | B2 | 3/2023 | Sheffield et al. |
| 2001/0034668 | A1 | 10/2001 | Whitworth |
| 2004/0201823 | A1 | 10/2004 | Raskar et al. |
| 2005/0035980 | A1 | 2/2005 | Lonsing |
| 2006/0137260 | A1 | 6/2006 | Shernaman |
| 2008/0071559 | A1* | 3/2008 | Arrasvuori ............. G06F 3/011 |
| | | | 705/26.1 |
| 2008/0162262 | A1* | 7/2008 | Perkins .................. G06Q 30/02 |
| | | | 715/757 |
| 2008/0191864 | A1* | 8/2008 | Wolfson .............. G06F 3/04815 |
| | | | 434/323 |
| 2009/0190858 | A1 | 7/2009 | Moody et al. |
| 2010/0321382 | A1 | 12/2010 | Amaratunga et al. |
| 2011/0202396 | A1* | 8/2011 | Viveiros ............. G06Q 30/0241 |
| | | | 52/173.1 |
| 2012/0062596 | A1 | 3/2012 | Bedi et al. |
| 2012/0127199 | A1 | 5/2012 | Aarabi |
| 2012/0231424 | A1 | 9/2012 | Calman et al. |
| 2013/0106910 | A1 | 5/2013 | Sacco |
| 2013/0106920 | A1 | 5/2013 | Park et al. |
| 2013/0196772 | A1 | 8/2013 | Latta et al. |
| 2013/0215116 | A1 | 8/2013 | Siddique et al. |
| 2013/0249948 | A1 | 9/2013 | Reitan |
| 2013/0305638 | A1 | 11/2013 | Wheeler |
| 2014/0072213 | A1 | 3/2014 | Paiton et al. |
| 2014/0082610 | A1 | 3/2014 | Wang et al. |
| 2014/0160115 | A1* | 6/2014 | Keitler ................. H04N 9/3194 |
| | | | 345/419 |
| 2014/0171039 | A1 | 6/2014 | Bjontegard |
| 2014/0176565 | A1 | 6/2014 | Adeyoola et al. |
| 2014/0279242 | A1 | 9/2014 | Staicut et al. |
| 2014/0285522 | A1 | 9/2014 | Kim et al. |
| 2015/0179147 | A1 | 6/2015 | Rezaiifar et al. |
| 2015/0206292 | A1* | 7/2015 | Masuko .................. G06T 5/006 |
| | | | 345/635 |
| 2015/0348313 | A1 | 12/2015 | Fuchikami et al. |
| 2016/0048497 | A1 | 2/2016 | Goswami |
| 2016/0051066 | A1 | 2/2016 | Koch |
| 2016/0086078 | A1 | 3/2016 | Ji et al. |
| 2016/0174902 | A1 | 6/2016 | Georgescu et al. |
| 2016/0180193 | A1 | 6/2016 | Masters et al. |
| 2016/0189426 | A1 | 6/2016 | Thomas et al. |
| 2016/0210602 | A1* | 7/2016 | Siddique ................. G06T 17/00 |
| 2016/0217615 | A1 | 7/2016 | Kraver |
| 2016/0275376 | A1 | 9/2016 | Kant |
| 2016/0300293 | A1 | 10/2016 | Nagar |
| 2016/0364793 | A1 | 12/2016 | Sacco |
| 2016/0371884 | A1 | 12/2016 | Benko et al. |
| 2017/0011558 | A1 | 1/2017 | Meier et al. |
| 2017/0021273 | A1 | 1/2017 | Rios |
| 2017/0039613 | A1 | 2/2017 | Kaehler et al. |
| 2017/0039986 | A1 | 2/2017 | Lanier et al. |
| 2017/0123750 | A1 | 5/2017 | Todasco |
| 2017/0132497 | A1 | 5/2017 | Santos et al. |
| 2017/0140236 | A1 | 5/2017 | Price et al. |
| 2017/0154425 | A1 | 6/2017 | Pierce et al. |
| 2017/0161592 | A1 | 6/2017 | Su et al. |
| 2017/0173466 | A1* | 6/2017 | Fahmie ................... A63F 13/27 |
| 2017/0178272 | A1 | 6/2017 | Lashkari et al. |
| 2017/0200313 | A1 | 7/2017 | Lee et al. |
| 2017/0229154 | A1 | 8/2017 | Bose et al. |
| 2017/0330273 | A1 | 11/2017 | Holt et al. |
| 2018/0060946 | A1 | 3/2018 | Devries |
| 2018/0068489 | A1 | 3/2018 | Kim et al. |
| 2018/0350144 | A1 | 12/2018 | Rathod |
| 2019/0172261 | A1 | 6/2019 | Alt et al. |
| 2019/0180104 | A1 | 6/2019 | Sheffield et al. |
| 2019/0318404 | A1 | 10/2019 | Lamontagne |
| 2021/0158624 | A1 | 5/2021 | Moon et al. |
| 2021/0209862 | A1 | 7/2021 | Seva et al. |
| 2021/0295052 | A1 | 9/2021 | Sheffield et al. |

FOREIGN PATENT DOCUMENTS

| | | |
|---|---|---|
| KR | 20140082610 | 7/2014 |
| WO | 2015192117 | 12/2015 |
| WO | 2016075081 | 5/2016 |
| WO | 2017100658 | 6/2017 |
| WO | 2017206451 | 12/2017 |
| WO | 2019118599 | 7/2019 |

OTHER PUBLICATIONS

Marner, Michael R., et al. "Spatial user interfaces for large-scale projector-based augmented reality." IEEE computer graphics and applications 34.6 (2014): 74-82.*

CA3,085,428, "Office Action", dated Nov. 24, 2022, 4 pages.

U.S. Appl. No. 17/343,009, "Notice of Allowance", dated Oct. 13, 2022, 11 pages.

U.S. Appl. No. 17/343,009, "Non-Final Office Action", dated Aug. 16, 2022, 10 pages.

CA3,085,428, "Notice of Allowance", dated Feb. 10, 2023, 1 page.

(56) References Cited

OTHER PUBLICATIONS

"3D Room Designer", Living Spaces, livingspaces.com, Jul. 2017, 5 pages.
"Display Mapper", Displaymapping4, Available Online at, web.archive.org/web/20160407215821/http://www.displaymapper.com:80/, Apr. 7, 2016.
U.S. Appl. No. 15/150,973, Final Office Action, dated Apr. 10, 2019, 15 pages.
U.S. Appl. No. 15/150,973, Final Office Action, dated Nov. 5, 2019, 17 pages.
U.S. Appl. No. 15/150,973, Non-Final Office Action, dated Dec. 21, 2018, 12 pages.
U.S. Appl. No. 15/150,973, Non-Final Office Action, dated Jul. 25, 2019, 18 pages.
U.S. Appl. No. 15/150,973, Notice of Allowance, dated Mar. 10, 2021, 18 pages.
U.S. Appl. No. 15/840,567, Non-Final Office Action, dated Feb. 8, 2018, 33 pages.
U.S. Appl. No. 15/840,567, Notice of Allowance, dated Sep. 17, 2018, 12 pages.
U.S. Appl. No. 16/222,333, Final Office Action, dated Jan. 15, 2021, 27 pages.
U.S. Appl. No. 16/222,333, Non-Final Office Action, dated Jul. 14, 2020, 26 pages.
U.S. Appl. No. 16/222,333, Notice of Allowance, dated Mar. 19, 2021, 12 pages.
Application No. CA2,966,447, Notice of Allowance, dated Sep. 4, 2019, 1 page.
Application No. CA2,966,447, Office Action, dated Oct. 4, 2018, 4 pages.
Cebulla, "Projection-Based Augmented Reality", Distributed Systems Seminar, 2013, 10 pages.
Cheng et al., "Locality-Sensitive Deconvolution Networks with Gated Fusion for RGB-D Indoor Semantic Segmentation", Computer Vision Foundation.
Hein, "3D Video Projection Mapping", Displaymapping 1, Image Audiovisuals, Jun. 12, 2015.
Izadinia et al., "IM2CAD", arXiv preprint arXiv:1608.05137, 2016.
Jatnes, "The Future of Retail: Projection-Mapped Mannequins & Interactive Window Displays", Displaymapping3, The Visualist, Oct. 4, 2012.
Kang et al., "Discovering Object Instances From Scenes of Daily Living", Computer Vision (ICCV), IEEE International Conference, 2011, 9 pages.
Li et al., "Rgb-d Scene Labeling With Long Short-'term Memorized Fusion Model", arXiv preprint arXiv:1604.05000, 2016, 17 pages.
Massa et al., "Deep Exemplar 2d-3d Detection by Adapting From Real to Rendered Views", Proceedings of the IEEE Conference on Computer Vision and Pattern Recognition, 2016, 10 pages.
McCormac, "Semanticfusion: Dense 3d Semantic Mapping With Convolutional Neural Networks", Robotics and Automation (ICRA), IEEE International Conference, 2017, 7 pages.
Neale, "Transforming Retail Display Through Scalable and Affordable Projection Mapping", Displaymapping2, DailyDOOH, Feb. 19, 2016.
Application No. PCT/US2018/065208, International Preliminary Report on Patentability, dated Jun. 25, 2020, 9 pages.
Application No. PCT/US2018/065208, International Search Report and Written Opinion, dated Jul. 2, 2019, 12 pages.
Qi et al., "PointNet: Deep Learning on Point Sets for 3D Classification and Segmentation", Computer Vision and Pattern Recognition (cs.CV), Apr. 10, 2017, pp. 1-19.
Schenker, "Map Projections Like The Best of 'em With This Madmapper Tutorial", Vice News, Aug. 12, 2011.
Unal et al., "Distant Augmented Reality: Bringing A New Dimension to User Experience Using Drones", Digital Applications in Archaeology and Cultural Heritage, vol. 17, 2020, 12 pages.
Wu et al., "Single Image 3d Interpreter Network", European Conference on Computer Vision, Springer International Publishing, 2016, 18 pages.
Xiang et al., "Objectnet3d: A Large Scale Database for 3d Object Recognition", European Conference on Computer Vision, Springer International Publishing, 2016, 16 pages.
Yurieff, "This Shopping App Lets You See a Virtual Couch in Your Real Living Room", CNN Tech, money.cnn.com, May 3, 2017, 3 pages.
Zahavy et al., "Is a Picture Worth a Thousand Words? A Deep Multi-modal Fusion Architecture for Product Classification in E-commerce", arXiv preprint arXiv:1611.09534, 2016, 10 pages.
Zhao et al., "Image Parsing With Stochastic Scene Grammar", Advances in Neural Information Processing Systems, 2011, 9 pages.
Zhao et al., "Scene Parsing by Integrating Function, Geometry and Appearance Models", Proceedings of the IEEE Conference on Computer Vision and Pattern Recognition, 2013, 8 pages.

\* cited by examiner

SYSTEMS AND METHODS FOR DISPLAYING A SIMULATED ROOM AND PORTIONS THEREOF

CROSS-REFERENCE TO RELATED APPLICATION

This application claims the benefit of U.S. patent application Ser. No. 15/150,973, filed May 10, 2016, granted as U.S. Pat. No. 11,062,383 on Jul. 13, 2021, the entire contents of which are hereby incorporated by reference for all purposes in its entirety.

FIELD OF THE INVENTION

Embodiments of the present invention relate generally to a display of a simulated room and portions thereof.

BACKGROUND

Traditionally, consumers have purchased products at in-store retail locations without having the opportunity to coordinate or review selections of the products in an actual physical room context. In-store purchases often require a consumer to rely on his or her recollection of a room in his or her mind or compare only a portion of a product with a portion of another product, for example, a paint color swatch with a single ceramic tile. Such visualizations and comparisons are not in a room setting and instead in a store aisle or other setting. Such conventional comparisons often do not account for other different considerations of the intended room, for example its physical dimensions or other physical limitations. Further, conventional computer modeling of design choices for a room are also limited to computer simulations, and do not provide a physical display of a simulated room.

BRIEF SUMMARY OF INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, a system for displaying a simulated room is described herein. The system comprises at least one projector, at least one wall structure element, at least one physical object, and a room customization station. The room customization station can be configured to permit viewing images of selectable products and selecting at least one of the selectable products to be displayed on at least one of the at least one wall structure element or the at least one physical object. In some embodiments, the at least one projector can be adapted to display the at least one of the selectable products on at least one of the at least one wall structure element or the at least one physical object.

The at least one wall structure element can comprise a magnet or a magnetically attractive material. In some such embodiments, the at least one wall structure comprising a magnet (or magnetically attractive material) may permit placement and positioning of other products or items comprising a magnet.

In some embodiments, the at least one physical object is adjustable. In some aspects, the at least one physical object can include a first wall structure that is movable relative to a second wall structure to adjust the distance between the first wall structure and the second wall structure.

The room customization station can comprise a first input device, a first output device, a first computer readable medium and a first processor in communication with the first input device, the first output device, and the first computer readable medium. The first processor can be configured for receiving the selection of the at least one selectable product, and communicating image information pertaining to the at least one selectable product to the at least one projector for displaying an image of the at least one selectable product in the simulated room. The room customization station can include a touchscreen display configured to present images of the selectable products to a user and configured to receive an indication of selectable products from the user. In some embodiments, the room customization station can be configured to prevent at least one portion of the images of the selectable products from being projected by the projector(s) onto a physical feature in the simulated room and allow other portions of the images of the selectable products to be projected into at least a portion of the simulated room located around the physical feature.

The room customization station can be configured to send and receive information from at least one data store. The at least one data store can comprise information and images pertaining to a plurality of products available to be displayed in the simulated room. The at least one data store can include at least one of a database, catalog, web page, script, information related to consumer account, products for purchase, purchased products, selected products, customizable products, customized products, customization parameters, or purchase history.

In some embodiments, the room customization station is configured to display product information to the user, in addition to the images of the selectable products. For example, the product information can include at least one of cost information, size information, and product availability information.

In some embodiments, systems described herein can be used to simulate at least one of a bathroom, kitchen, garage, closet, living room, or other living space.

The systems described herein can further include at least one physical accessory adapted to be placed in the simulated room to facilitate visualization of how the at least one physical accessory would appear in the presence of the simulated room and the at least one selectable product. A physical accessory can include products often found in a particular type of room. The physical accessory can be displayed in conjunction with the at least one physical object and the images displayed by the at least one projector.

In some embodiments, systems described herein can include at least one mobile device comprising a scanner configured to scan a product identifier associated with a product and to communicate at least a product identity to the room customization station. The product identifier can include at least one of a QR code, a barcode, or a label. The at least one mobile device can be in communication with the room customization station such that scanned products can be viewed at the room customization station.

In other embodiments, methods of displaying a simulated room are described herein. The methods can comprise providing at least one wall structure; providing at least one physical object; receiving a product selection from a room customization station; transmitting information associated with the product selection to at least one projector; and displaying an image of the product selection on at least one of the wall structure element and the physical object. In some embodiments, the methods can include displaying cost information associated with the product selection. In some embodiments, the methods can include adjusting the size of the at least one physical object based on the product selection.

These and other embodiments are presented in greater detail in the Detailed Description which follows.

DETAILED DESCRIPTION

Figure 1:
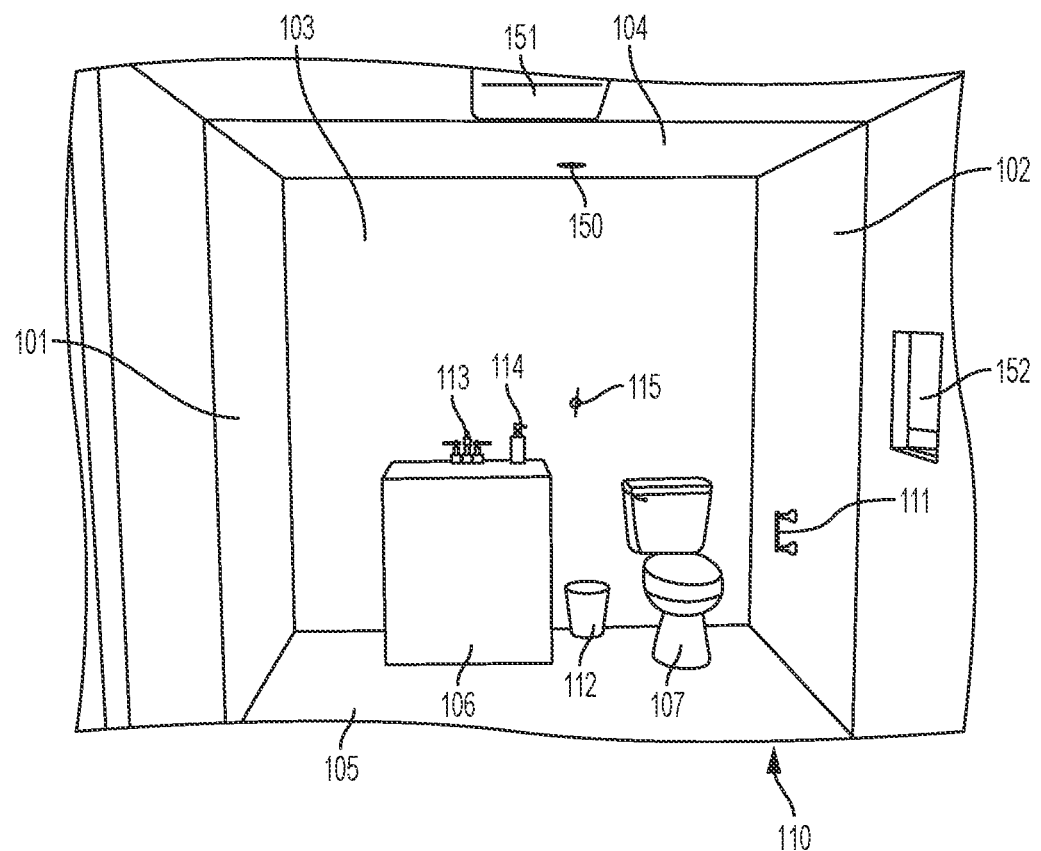
FIG. 1 shows a front view of a system for displaying a simulated room according to one embodiment of the present invention.

Systems and methods described herein relate generally to the display of a simulated room. The systems and methods described herein may be used to aid a consumer in making design decisions and/or purchase selections for different products related to a room, for example, decisions and selections that coordinate different products in the room. Described herein are systems and methods that include both projected images and actual physical objects to simulate a room, for example, a bathroom, kitchen, garage, closet, living room, other living space, or other rooms.

Often in a retail or design setting, a user must make design and purchase decisions without the benefit of reviewing the different selections in a room setting and without the benefit of the context of the physical setting and dimensions of a room. For example, conventionally, when designing or remodeling a bathroom, a user may view a paint sample or swatch and a single piece of flooring or ceramic tile next to a particular bathroom vanity while in a store. Such conventional methods of in-store selections may be less desired as such methods can fail to account for the physical space in which the paint, tile, and vanity will ultimately be used and can fail to account for other items in the room, for example, a toilet, mirrors, faucets, and other accessories. Some embodiments of the present invention provide a simulated room or portions thereof to provide more information to a consumer to aid in the visualization and selection of different products and design features.

The systems and methods described herein utilize a physical structure, e.g., a plurality of wall structure elements, and a physical object or objects that may be located in a particular room in conjunction with at least one projector that can project an image onto the physical structure (e.g., the plurality of wall structure elements) and onto the at least one physical object. The at least one projector can project an image on a surface or surfaces to display a selected design choice or feature in the particular physical structure. For example, the at least one projector can project different colors, patterns, accessories, or other design choices onto the physical structure and onto the at least one physical object to provide a simulated room showing the different design choices. In some embodiments, the design choices can be changed and displayed. For example, different wall colors or treatments can be displayed in a series of simulated rooms. A consumer can customize the design choices to match his or her style, budget, size of room, or other design considerations. Systems and methods described herein can permit a comparison of different design choices in a simulated environment, which can provide a user more information to visualize and consider when making his or her product selections, for example, more information related to at least one of an aesthetic perspective, a spatial perspective, and a financial perspective. The system can be configured to make use of projections (or other virtual displays) of cumbersome, heavy and/or large objects, and also allow smaller, more portable, and lighter-weight products and objects to be physically moved into and out of the simulated room, so that a user can switch in-and-out design combinations much faster and more conveniently than otherwise might be the case without the projection or virtual display of the more cumbersome objects. The system thereby affords users the benefit of visualizing actual finishes, colors and textures of less cumbersome objects e.g., faucets, towel racks, soap dispensers, waste baskets, tissue containers, etc.) and the convenience of still quickly switching in-and-out images of the more cumbersome objects and products (e.g., flooring, large painted surfaces, vanities, large appliances, large cabinets, large mirrors, wall-mounted lighting fixtures, etc.).

In some embodiments, the systems and methods include a room customization station that provides a system to view and choose from among a plurality of design choices. For example, in some embodiments, the room customization station can include a display in communication with a data store of different products that may be displayed in a room. A user can view the different options and product selections available for use in the room on the display of the room customization station and make different selections of purchasable products for display in the room.

For example, a user can view different paint colors, floor treatments, wall configurations, back splashes, tile selections, product colors, accessories, accessory placements, articles of furniture, furniture sizes, cabinet sizes, cabinet treatments, finishes, flooring, pulls or knobs, light fixtures, appliances, shelving, shelving configurations, finials, hooks, and other like customizable design features. Once selected at the room customization station, the different design choices can be communicated by the room customization station through a network to an electronic device such that the electronic device then outputs images of the selections to at least one projector. The at least one projector can project images of the different design selections onto the physical structure and onto the at least one physical object for display in the simulated room. In some embodiments, the room customization station can communicate directly to the at least one projector.

The room customization station can be in communication with at least one data store that includes different product options (e.g., information and images pertaining to a plurality of products available to be displayed). For example, the source of different product options can include one or more data stores. In various embodiments, one or more data stores comprise databases, catalogs, web pages, scripts, information related to consumer accounts, products for purchase, purchased products, selected products, customizable products, customized products, customization parameters (e.g., paint colors or color formulas), purchase history, one or more objects, and/or other information.

In some embodiments, the room customization station comprises an electronic device. In some aspects, the electronic device can be a laptop, a desktop computer, a tablet computer, a mobile phone, a personal digital assistant (PDA), or another suitable computing device. For example, in some embodiments, an electronic device comprises memory, a processor, a network interface, and a display. In some embodiments, the electronic device may be in communication with one or more user interface devices. As another example, in one embodiment, the electronic device does not comprise a network interface. Numerous configurations having fewer or additional components for the electronic device are within the scope of this disclosure.

The electronic device comprises a computer-readable medium, such as a random access memory (RAM), coupled to a processor that executes computer-executable program instructions and/or accesses information stored in memory. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the electronic device may comprise a single type of computer-readable medium such as random access memory (RAM). In other embodiments, the electronic device may comprise two or more types of computer-readable medium such as random access memory (RAM), a disk drive, and cache. The electronic device may be in communication with one or more external computer-readable mediums such as an external hard disk drive or an external DVD drive.

In some embodiments, the electronic device comprises a processor which executes computer-executable program instructions and/or accesses information stored in memory. The instructions may comprise processor-specific instructions generated by a compiler and/or an interpreter from code written in any suitable computer-programming language including, for example, C, C++, C#, Visual Basic, Java, Python, Perl, JavaScript, and Action Script®. In an embodiment, the electronic device comprises a single processor. In other embodiments, the electronic device comprises two or more processors.

The electronic device comprises a network interface for communicating via wired or wireless communication. For example, the network interface may allow for communication over networks via Ethernet, IEEE 802.11 (Wi-Fi), 802.16 (Wi-Max), Bluetooth, infrared, etc. As another example, network interface may allow for communication over networks such as CDMA, GSM, UMTS, or other cellular communication networks. The electronic device may comprise two or more network interfaces for communication over one or more networks.

The electronic device may comprise or be in communication with a number of external or internal devices such as a mouse, a trackpad, CD-ROM, a DVD, a keyboard, a display, a barcode scanner, an FOB reader, an RFID reader, audio speakers, one or more microphones, or any other input or output devices. For example, the electronic device comprises a display and is in communication with various user interface (UI) devices. The display may use any suitable technology including, but not limited to, LCD, LED, CRT, and the like. In one embodiment, the display is a touch-sensitive display. In other embodiments, the display is not touch-sensitive.

Once a user selects different product selections at the room customization station comprising the electronic device, the electronic device can send information and/or image data to a second electronic device that can output the information and/or image via an output device, for example, at least one projector. The second electronic device receiving the information and/or image data from the first electronic device can send information and/or the image data to the at least one projector for the display of images onto the physical structure and/or at least one physical object.

The second electronic device may be a tablet computer, a personal computing device, a personal digital assistant, a mobile phone, a desktop computer, a laptop computer, or any other electronic device suitable for providing one or more of the features described herein.

In some embodiments, the system for displaying a simulated room includes at feast one physical object. The at least one physical object can include an article of furniture, cabinetry, toilet, shelving, or other like objects, or structure that simulates such an article or object. In some embodiments, the at least one projector can project an image onto the at least one physical object.

In some embodiments, a physical object can be adjustable. For example, the dimensions of the physical object can change. As an illustrative example, in embodiments where the at least one physical object comprises a simulated bathroom vanity structure, the width of the structure can increase, or decrease, based on a specific vanity product selection made by the user. Multiple different sized bathroom vanities may be available for purchase. Embodiments described herein can utilize an adjustable bathroom vanity object to provide a system that simulates different sizes of bathroom vanities in a simulated room. The at least one projector can also adjust the size of the projected image to be displayed on the simulated bathroom vanity structure depending on the size selected. Other adjustable physical objects are disclosed herein and others are within the scope of this disclosure. Such embodiments may be beneficial to a user when selecting a first sized physical object as compared to second sized physical object so that the user visualizes and gathers more information about the design choices, for example, information related to the physical spatial limitations of the intended room.

In some embodiments, the adjustable physical object can include a first wall structure that can be positioned on a moveable system such that it is displaceable in a direction toward and away from an opposite second wall structure. In some embodiments, the first wall structure can be positioned on rollers, rails, carriage, ball bearings, wheels, or other devices to permit the movement of the first wall structure. In some embodiments, the first wall structure can be moved manually. In some embodiments, the first wall structure can be moved automatically via a motor. In some such embodiments, the motor can be in communication with an electronic device that can send instructions for the movement of portions of the physical object, which are consistent with the product specified by a user, for example via a selection on the room customization station.

Systems for displaying a simulated room described herein may include at least one physical accessory adapted to be placed in the simulated room to facilitate visualization of how the at least one physical accessory would appear in the presence of the simulated room and at least one selectable product. A physical accessory includes products often found in a particular type of room. For example, in a bathroom, a physical accessory can include towel bars, towel rings, hooks, trash receptacle, soap dispensers, soap dishes, toilet paper holders, hardware, knobs, pulls, mirrors, frames, faucets, containers, baskets, or other like items. As another example, in a kitchen, a physical accessory can include racks, pots, appliances, baskets, faucets, towel bars, hooks, drying racks, storage containers, knobs, pulls, or other like items.

In some embodiments, the at least one physical accessory can be placed on a physical surface. In some embodiments, the at least one physical accessory can comprise a magnet. In such embodiments, the physical structure, for example, a wall structure, may comprise a magnetically attractive material, and the at least one physical accessory comprising a magnet can be placed onto the magnetically attractive portion(s) of the physical structure. Alternatively, the wall structure might include a magnet, and the at least one physical accessory can include a magnetically attractive material. In some embodiments, the at least one physical accessory can be positioned in the simulated room with the aid of an adhesive, hook-and-loop fasteners, nails, stickers, magnets, decals, tape, or other method to assist in the positioning and temporary retention of the at least one physical accessory.

Systems for displaying a simulated room described herein can permit a user to select different physical accessories and position such physical accessories in the simulated room to provide a three-dimensional simulated room, rather than a two-dimensional simulated room, limited to images only. Systems for displaying a simulated room described herein can provide a combination of two-dimensional images with three-dimensional products that may provide a user with more information to aid in his or her product visualization and product purchase or design decisions.

In some embodiments, a user can review or browse different products in a store and select a product for display in a simulated room. In some embodiments, the physical product can include, for example, a physical accessory as described above. In some embodiments, a user can review different products in a store and select a product with the aid of an electronic device, for example, by scanning a QR code, barcode, or other unique identifier associated with the product. The electronic device can communicate the identity of the selected product to a database or other account so that the selected product can be viewed and/or selected at the room customization station. Upon selecting the product at the room customization station, an image associated with the product can be displayed by the projector on the physical structure to simulate a room with the selected product.

In some embodiments, the user can have a customized user account that includes different customized products, personalized products, saved set of products, list of past purchased products, and other information. In some embodiments, the system can access the user account via an electronic device to gather information on different products that can in turn be displayed in the simulated room. A user can populate his or her user account at the store or remotely via a network, for example, the Internet, which can later be accessed for display at the simulated room.

In some embodiments, the selected product, or at least one selected product, can have cost identification information associated with each product. The cost identification information can be displayed to a user during the selection of products at the room customization station. In some embodiments, once a user selects each of the different product selections for a particular simulated room, the room customization station can calculate and display the total cost associated with the particular products selected and displayed in the simulated room display.

Certain aspects of the present invention will now be discussed in connection with the attached Figures which illustrate some embodiments of the present invention. Although the description associated with the Figures will focus on embodiments shown in the Figures, it should be understood that only slight modifications need to be made to the components in order to provide systems for displaying a simulated room embodying the inventive concepts described in this application. Referring to the Figures, the numbers used within each figure are consistent with every other figure. When a specific feature is labeled in one figure with a specific numeral, the same numeral will be used in other figures when denoting that specific feature.

While FIGS. 1-2, 4A, and 4B show illustrative systems and methods for a bathroom, the systems and methods can be used in any other types of rooms, for example, bathroom, kitchen, garage, closet, living room, or other living space.

FIG. 1 shows a system 100 that includes a first wall structure 101, a second wall structure 102, and a third wall structure 103. The system 100 includes a ceiling structure 104 and a floor structure 105. The first wall structure 101, the second wall structure 102, the third wall structure 103, the ceiling structure 104, and the floor structure 105 define the physical space of simulated room 110. The simulated room 110 has a first width, first height, and first depth. In some embodiments, the simulated room 110 can have a second width, second height, or second depth, or combinations thereof to provide a different sized space. The invention described herein is not limited to a particular size of simulated room.

In some embodiments, the simulated room 110 can be adjustable. For example, the simulated room 110 can comprise a first wall structure that is moveable relative to the second wall structure. In some embodiments, the first wall structure can be positioned on a moveable system such that it is displaceable in a direction toward and away from the second wall structure. In some embodiments, the first wall structure can be positioned on rollers, rails, carriage, ball bearings, wheels, or other devices to permit the movement of the first wall structure. In some embodiments, the first wall structure can be moved manually. In some embodiments, the first wall structure can be moved automatically via a motor. In some such embodiments, the motor can be in communication with an electronic device to direct the movement and position the first wall structure according to information input into the electronic device. As described in connection with FIG. 3, the information can be input into a room customization station comprising an electronic device.

FIG. 1 additionally includes a physical object 106. In FIG. 1, the physical object 106 is a box that represents a bathroom vanity. The physical object 106 can be positioned in a plurality of locations in the simulated room 110. In some embodiments, the physical object 106 has a first width, first height, and first depth. In some embodiments, the physical object 106 can have a second width, second height, or second depth, or combinations thereof to provide a different sized physical object. In some embodiments, the physical object can be adjustable, as described in connection with FIGS. 4A and 4B.

The simulated room shown in FIG. 1 also includes physical object 107. The example of a physical object 107 in FIG. 1 is a toilet. The physical object 107 can be stationary or moveable. In some embodiments, the physical object 107 can be moved manually or automatically via a controller, motor, or other like devices. Other simulated rooms can include one or more additional or different physical objects.

FIG. 1 further shows physical accessories 111, 112, 113, 114, and 115. Any number of accessories can be included in a simulated room. In some embodiments, no accessories are included in the simulated room. In some embodiments, the accessories, and their placement, can provide additional information to a consumer when visualizing the simulated room and making design and purchase choices, for example to aid in the understanding of the physical limitations of a defined space. For example, a consumer can consider whether a particular sized bathroom vanity has sufficient room for the consumer to include a particular faucet, soap dispenser, or other accessory. As another example, a consumer can consider whether a particular sized bathroom vanity in the simulated room provides sufficient room for a trash receptacle to be positioned in a certain location and whether a particular combination of accessories look good together and look good with other aspects of the room and with the vanity.

In some embodiments, to facilitate placement of the accessories, the first wall structure 101, the second wall structure 102, and/or the third wall structure 103 can be magnetically attractive. In some such embodiments, an accessory, for example, accessory 111 (resembling a toilet paper roll holder) can comprise a magnet that permits placement and retention of the accessory 111 on the wall structure 101, 102 and/or 103.

In the embodiment shown in FIG. 1 (and FIG. 2), three projectors are being utilized. The first projector 151 is positioned at the top, center of the simulated room at the end distal to the third wall structure 103. The first projector 151 is oriented to project an image generally in the direction of the third wall structure 103, recognizing that the image will project an image on more than the third wall structure 103. The second projector 150 is positioned in the center of the ceiling structure 104 and oriented to project an image generally in the direction of the floor structure 105. The third projector 152 is positioned near the second wall structure 102 and oriented such that it projects an image generally in the direction of toward the third wall structure 103 and the first wall structure 101. The projectors 150, 151, and 152 each display coordinated images onto physical wall structures and the physical objects as directed by an electronic device, as described below in connection with FIG. 3.

Figure 2:
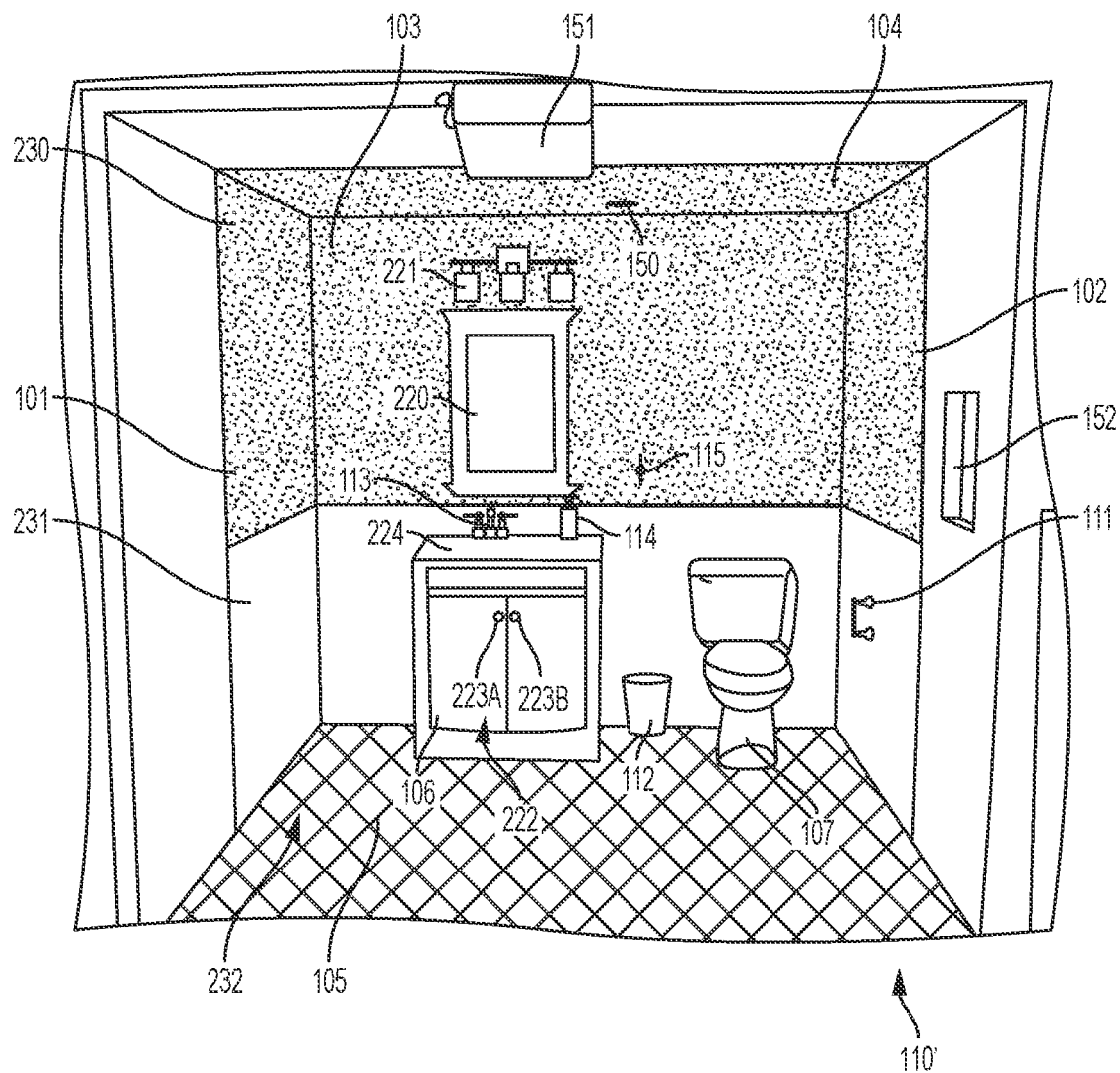
FIG. 2 shows a front view of a system for displaying a simulated room according to one embodiment of the present invention.
Figure 3:
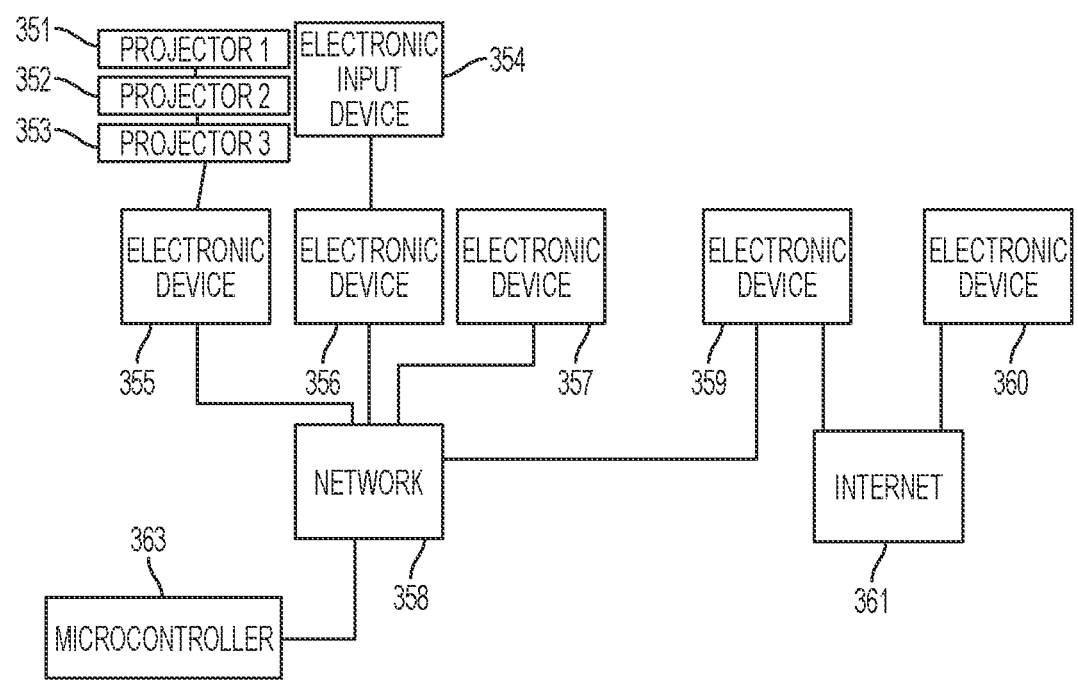
FIG. 3 is a system diagram showing a system for displaying a simulated room according to one embodiment of the present invention.

FIGS. 1-3 show one configuration of a plurality of projectors. It is understood that any number of projectors can be used and positioned at numerous other different positions to provide a simulated room without departing from scope of the invention.

FIG. 1 shows the simulated room 110 without any projected images displayed in the simulated room 110. In some embodiments, the simulated room 110 comprises surfaces having neutral colors to provide a more neutral or blank canvas for images to be projected on to the surfaces. For example, the first wall structure 101, the second wall structure 102, the third wall structure 103, the ceiling structure 104, and the floor structure 105 each comprise a solid white color. The physical object 106 and the physical object 107 also can be white in color. As shown in FIG. 2, images can be projected onto each of these surfaces to provide a different look to each of the surfaces in the simulated room 110'.

Turning to FIG. 2, the simulated room 110' includes different selected images projected onto the different surfaces of simulated room 110'. As discussed in more detail in connection with FIG. 3, a user can select different features to be projected into simulated room 110'. For example, a flooring pattern and color image 232 can be selected and projected onto floor structure 105 to simulate a particular flooring pattern and color. The user can select different paint colors to be projected on the first wall structure 101, the second wall structure 102, and the third wall structure 103. In FIG. 2, the first wall structure 101, the second wall structure 102, and the third wall structure 103 each show two different regions having a first wall color image 230 on top and a second wall color image 231 on the bottom.

In FIG. 2, the third wall structure 103 includes an image 220 and image 221. In FIG. 2, image 220 shows a mirror product, and image 221 shows a light fixture product. As described below in connection with FIG. 3, the user can select different particular products from a data store and display an image that simulates the particular selected product in the simulated room. For example, in FIG. 2, an image 220 of a mirror product is shown on the third wall structure 103, being positioned above the physical object 106 and being projected with the image of the particular wall color image 230 on the third wall structure 103. Also shown in FIG. 2, is an image 221 of a lighting fixture being projected above the physical object 106 and being projected with the image of the particular wall color image 230 and the image 220 on the third wall structure 103. The simultaneous projection of image 220, image 221, and the wall color image 230 in connection with the physical object may permit a more informed, confident, and thought-through visualization, selection and purchase of different features for a room by a consumer. The simulated room 110' shows a three-dimensional simulation of the different product selections (as opposed to systems limited to two-dimensional simulations). The simulated room 110' can provide a more complete visualization of a design choice of a room for a user before selecting and purchasing certain products.

Figure 4A:
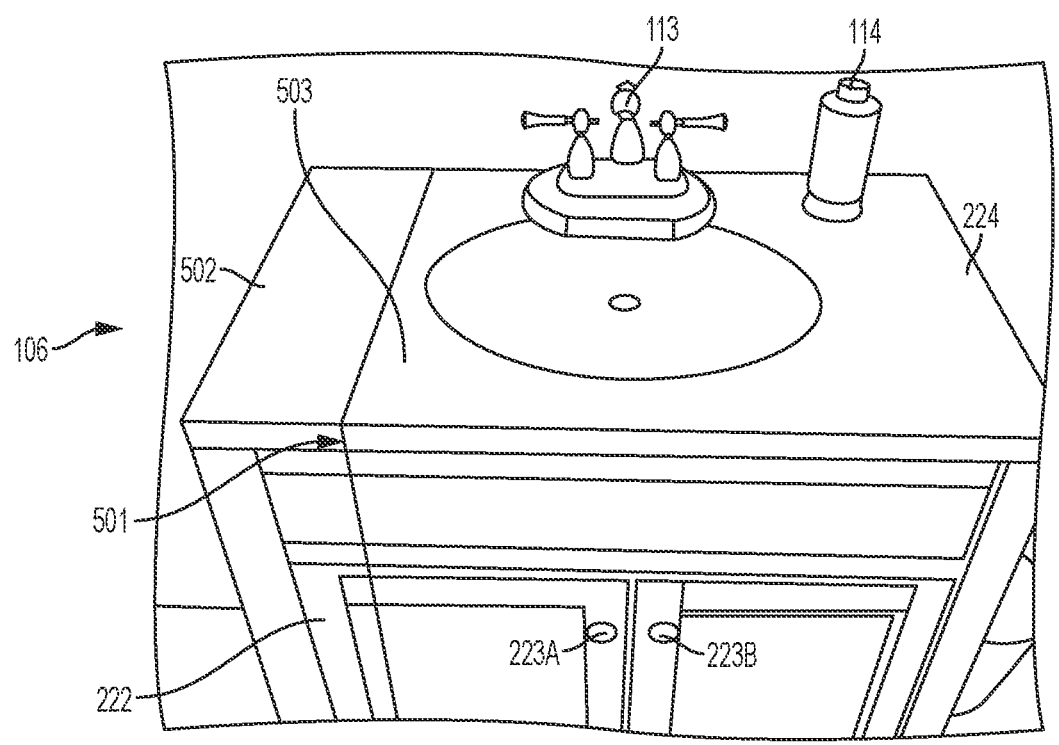
FIG. 4A shows an article in a first configuration according to one embodiment of the present invention.
Figure 4B:
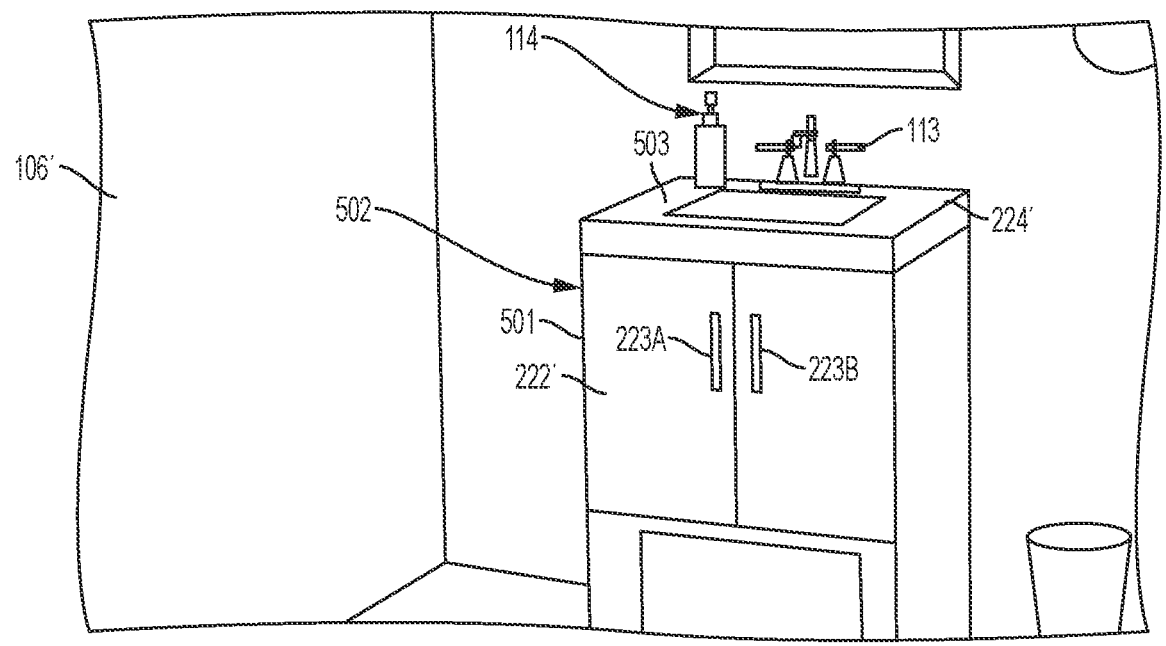
FIG. 4B shows the article shown in FIG. 4A in a second configuration according to one embodiment of the present invention.

In FIG. 2, the physical object 106 also includes at least one image projected on the visible surfaces of physical object 106. The physical object 106 is illuminated with images of cabinet finish 222, cabinet pulls or knobs 223A, 223B, and vanity top color image 224. As described in connection with FIG. 3, the user can select different particular products from a data store and display an image that simulates a particular product. In FIG. 2, accessories 113 and 114 remain positioned on the physical object 106 with the projected images 222, 223A, 223B, and 224. FIGS. 4A and 4B show the physical object 106 and 106'.

Turning to FIGS. 4A and 4B, FIG. 4A shows the physical object 106 in a first configuration having a first width, first height, and first depth. FIG. 4B shows the physical object 106' in a second configuration having a first height and first depth, but having a second (different) width. The physical object 106' also includes a second projected image 222', 223A, 223B, and 224' to represent different selections made by a user. The physical object 106 and 106' comprise a first structure 503 (e.g., the right side of the physical object) and second structure 502 (e.g., the left side of the physical object) that can move relative to one another to permit adjustment of the overall width of the physical object. The first structure 503 comprises a first set of dimensions that are each greater than the same respective dimensions of the second structure 502 thus permitting the second structure 502 to move laterally such that the second structure 502 can be positioned telescopically (at least partially) within the first structure 503 (e.g., when a narrow vanity is being simulated). Position 501 in FIGS. 4A and 4B show the seam between the first structure 503 and the second structure 502. In FIG. 4B, for example, the second structure 502 is retracted to a position flush with the seam 501 to represent a narrowest of the vanities to be displayed. In FIG. 4A, by contrast, a wider vanity is represented, and accordingly, a substantial portion of the second structure 502 extends out from the first structure 503, past the seam 501 (toward the left in the drawing).

In FIGS. 4A and 4B, the second structure 502 of the physical object 106, 106' is positioned on a moveable system such that it can be displaceable selectively in a direction toward or away from (into or out of) the first structure 503. In other embodiments, both the first structure 503 and/or the second structure 502 can be positioned on a moveable system and capable of being displaced. In some embodiments, the first structure 503 and/or the second structure 502 can be positioned on rollers, rails, carriage, ball bearings, wheels, or other devices to permit the movement of the respective structures. In FIGS. 4A and 4B, the second structure 502 can be moved automatically via a motor, which is in communication with an electronic device that can send instructions for the movement of the second structure 502 to provide an object 106, 106' width based on the product (e.g., a vanity) specified by a user, for example, via a selection on the room customization station. If more than two widths of products are to be simulated, the first and second structures 503, 502 can be configured to expand to a maximum width of the products, contract to a minimum width of the products, and expand or contract to any other widths in between the maximum and minimum.

It is understood that the physical object can have similar moveable systems that permit other dimensions or orientations to be adjusted. For example, in some embodiments, the physical object may be configurable to have a first depth and a second depth (or other depths in-between), and in some embodiments, the physical object may be configurable to have a first height and a second height (or other heights in-between), depending on the particular product selected by the user to be displayed in the simulated room.

FIG. 3 illustrates a system diagram depicting exemplary devices in an exemplary computing environment according to an embodiment. The system 300 shown in FIG. 3 includes three projectors 351, 352, 353, an electronic input device 354, electronic devices 355, 356, 357, and a network 358. In the embodiment shown in FIG. 3, each of the electronic devices 355, 356, 357 is in communication through the network 358. In other embodiments, fewer or additional electronic devices may be used according to various systems, for example, electronic device 357 may not be connected to the network 358 or other electronic devices can be connected to the network 358.

FIG. 3 also shows an electronic device 359 and an electronic device 360. Electronic devices 359, 360 can comprise a tablet computer, desktop computer, cell phone, PDA, laptop computer, or other like device with access to the Internet 361, or other network. The electronic devices 359, 360 can access different webpages, applications, local web available resources, or other data stores to identify and select different products to be displayed in the simulated room. The information about the product selections can be communicated via the network 358 to the electronic devices 355 and 356 for review and potential display in the simulated room.

A network can facilitate communications between any number of devices. In the embodiment shown in FIG. 3, the network 358 facilitates communications between the electronic devices 355, 356, 357. The network 358 may also facilitate communications between other devices such as an electronic device 359, an electronic device 360, and/or other devices. The network 358 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 358 may be a single network. In other embodiments, the network 358 may comprise two or more networks. For example, the electronic devices 355, 356, 357 may be connected to a first network and electronic device 359 or electronic device 360 may be connected to a second network. The first and the second network may be connected or otherwise in communication with each other. Numerous other network configurations are disclosed herein and others are within the scope of this disclosure.

One or more devices may be capable of communicating with one or more networks, such as network 358 and/or other networks, and be capable of sending and receiving information to and from another device, such as electronic computing devices or a web server. For example, in FIG. 3, one electronic device 356 may be a room customization station that includes a touch-sensitive display. The electronic device 356 can communicate with the network 358 by using a wired network connection. In other embodiments, the electronic device 356 can communicate with the network 358 by using a wireless network interface card.

A user can review different product categories and products at electronic input device 354. In some embodiments, electronic input device is an LCD or an ELO touchscreen device. The user can view images of selectable products and select one or more different products from different product categories or groups. The electronic input device 354 is in communication with electronic device 356 that receives the user selections and communicates such selections through the network 358 to the electronic device 355. The electronic devices 354, 355 and 356 can be deployed to serve the aforementioned room customization station. The electronic device 355 receives the information from the network 358 and sends instructions to the projectors 351, 352, and 353 for displaying images of the selected products. The room customization station e.g., including the electronic devices 354, 355 and/or 356) can be configured to prevent at least one portion of the images of the selectable products (e.g., the flooring pattern projected onto the floor 105 in FIG. 2) from being projected by projectors 351, 352, 353 onto a physical feature (e.g., onto the toilet 107 in FIG. 2) in the simulated room and allow other portions of the images of the selectable products (e.g., the flooring pattern projected onto the floor 105 in FIG. 2) to be projected onto at least a portion of the simulated room located around the physical feature (e.g., onto the portion of the floor 105 located around the toilet 107 in FIG. 2). Such selective projection around features can be achieved, for example, using optical blocking techniques or by blackening, in the image data or file, pixels that correspond to the location of the features, and/or using projection mapping software (e.g., commercially available "MadMapper" projection mapping software).

In the particular example, shown in FIGS. 1 and 2, the user can review at least the following categories of products: wall color, wall treatment, floor color, flooring pattern, mirror, light fixtures, cabinet finish, cabinet size, cabinet pulls, and counter top color. The simulated room 110 shown in FIG. 1 does not include any product selections shown in the room. The simulated room 110' shown in FIG. 2 includes the product selections shown in the room. Each of the product options can be changed or adjusted. For example, a different color paint could be selected to be displayed on the wall structures, a different sized vanity could be shown, or different mirror product could be displayed, and thus display a second, third, fourth or more simulated room(s). Electronic device 356 can be linked (via the network 358 or otherwise) to a microcontroller 363 associated with the adjustable object 106. The microcontroller 363 can be electrically connected (directly or indirectly) to a motor (or other mechanism) that is adapted to adjust at least one dimension of the adjustable object 106. In the aforementioned example of a simulated vanity, the selection of a particular vanity by a user of electronic device(s) 354/356 can trigger a signal to microcontroller 363 from the electronic device(s) 354/356. The microcontroller 363 can respond to this signal by activating the motor or other actuation mechanism of the object 106 to cause the object 106 to assume a desired width corresponding to the width of the selected vanity. A variety of commercially available microcontrollers alternative electronic controllers) can be programmed to achieve desired adjustments of the adjustable object 106. Examples of such a microcontroller include the Arduino line of microcontrollers which can be programmed to control movement and adjustments based on various configurable input signals.

Electronic device 357 can include an additional electronic device that can send and receive information to the network for possible display in the simulated room, for example, information to populate the different product options or selections to be viewed at the electronic input device 354. For example, the electronic device 357 can include a tablet computer, a mobile phone, a personal digital assistant, or other mobile device that can be used to review and/or identify additional products for consideration or display. In some embodiments, the electronic device 357 can be used to identify particular products available in a store that a user is interested in viewing in the simulated room. The user can view a product in the store and then scan or otherwise select the product using the electronic device 357 by, for example, using a QR reader or a bar code scanner, or other scanning device. The selections can be communicated through the network 358 and ultimately to the electronic input device 354 for review.

In some embodiments, for each simulated room, different financial information can be shown. For example, each product to be displayed can include associated financial information. Once selected, the cost information for each product can be sent and received from the network, the different data stores, and electronic device, such that a total cost of the particular simulated room can be displayed to a user. For example, in FIG. 2, one or more of the cost of the particular vanity (physical object 106), cabinet pulls 223A, 223B, accessories 111, 112, 113, 114, 115, mirror 220, lighting fixture 221, paint color, floor treatment 105, and toilet (physical object 107) can be provided to a user at the room customization station through the electronic input device 354.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A system for displaying a simulated room comprising:
    at least one physical object occupying a volume representative of a product type within a physical space;
    a room customization station for viewing images of selectable products and receiving a selection of a product combination of the selectable products to be displayed,
    at least one projector configured to:
        project a first set of visual attributes of a first product of the product combination onto the at least one physical object, the first product being of the product type; and
        project a second set of visual attributes of a second product of the product combination onto the physical space.

2. The system of claim 1, wherein a size of the at least one physical object is adjustable based on a product selection of the product type;
    and wherein the simulated room comprises at least one of a bathroom, kitchen, garage, closet, living room, or other living space.

3. The system of claim 1, wherein a position of the at least one physical object is adjustable.

4. The system of claim 3, wherein the at least one physical object comprises a first wall structure that is movable relative to a second wall structure to adjust a distance between the first wall structure and the second wall structure.

5. The system of claim 1, wherein the room customization station comprises:
    a first input device;
    a first output device;
    a first computer readable medium; and
    a first processor in communication with the first input device, the first output device, and the first computer readable medium, the first processor configured for:
        receiving the selection of the product combination, and
        communicating image information pertaining to the first product to the at least one projector for displaying an image of the first product in the simulated room.

6. The system of claim 1, wherein the room customization station is configured to prevent the first set of visual attributes from being projected by the at least one projector onto a physical feature in the physical space and allow the second set of visual attributes to be projected into at least a portion of the physical space other than the at least one physical object.

7. The system of claim 1, wherein the room customization station is configured to send and receive information and images from at least one data store, the information and the images pertaining to the product combination to be displayed as the selectable products.

8. The system of claim 7, wherein the at least one data store comprises at least one of a database, catalog, web page, script, information related to consumer account, products for purchase, purchased products, selected products, customizable products, customized products, customization parameters, or purchase history.

9. The system of claim 1, wherein the room customization station comprises a touchscreen display configured to at least: (i) present images of the selectable products to a user and configured to receive an indication of selected products from the user or (ii) display product information to the user, in addition to images of the selectable products.

10. The system of claim 1, wherein the at least one projector is further configured to:
project a third set of visual attributes of a third product of the product combination onto the at least one physical object, the third product being of the product type and the third set of visual attributes being different than the first set of visual attributes.

11. The system of claim 9, wherein the product information comprises at least one of cost information, size information, and product availability information.

12. The system of claim 1, wherein a surface area of the second set of visual attributes projected onto the physical space depends on the product combination selected at the room customization station.

13. The system of claim 1, further comprising at least one physical accessory adapted to be placed in the simulated room to facilitate visualization of how the at least one physical accessory would appear in the presence of the simulated room and the product combination, wherein the simulated room comprises a physical environment.

14. The system of claim 1, further comprising at least one mobile device comprising a scanner configured to scan a product identifier associated with a product and to communicate at least a product identity to the room customization station.

15. The system of claim 14, wherein the product identifier is at least one of a QR code, a barcode, or a label.

16. A method for displaying a simulated room comprising:
providing at least one physical object occupying a volume representative of a product type within a physical space;
receiving a selection of a product combination of selectable products from a room customization station;
transmitting information associated with the product combination to at least one projector;
displaying, via the at least one projector, a first set of visual attributes of a first product of the product combination onto the at least one physical object, the first product being of the product type; and
displaying, via the at least one projector, a second set of visual attributes of a second product of the product combination onto the physical space.

17. The method of claim 16, wherein the second product is not of the product type.

18. The method of claim 16, wherein projecting the first set of visual attributes causes an appearance of the at least one physical object to take on the first set of visual attributes of the first product.

19. The method of claim 16, wherein the at least one physical object comprises a structure that simulates the product type, wherein the first set of visual attributes is projected onto the at least one physical object such that the at least one physical object takes on an appearance of the first product.

20. The method of claim 16, wherein the physical space at least comprises a magnet or magnetically attractive material.

* * * * *